United States Patent [19]
Barrett

[11] Patent Number: 5,285,070
[45] Date of Patent: Feb. 8, 1994

[54] AIR TURBULENCE DETECTOR

[75] Inventor: Joseph J. Barrett, Morris Plains, N.J.

[73] Assignee: Allied-Signal Inc., Morris Township, Morris County, N.J.

[21] Appl. No.: 862,116

[22] Filed: Apr. 2, 1992

[51] Int. Cl.⁵ ............................................. G01N 21/00
[52] U.S. Cl. .................................. 250/338.5; 340/968
[58] Field of Search ..................... 250/338.5; 340/968

[56] References Cited

U.S. PATENT DOCUMENTS

| | | | |
|---|---|---|---|
| 3,402,295 | 9/1968 | Astheimer | 250/340 |
| 3,475,963 | 11/1969 | Astheimer | 374/123 |
| 3,665,467 | 5/1972 | Haroules et al. | 342/351 |
| 3,780,293 | 12/1973 | Flint | 250/339 |
| 4,590,374 | 5/1986 | Brewster | 250/338.1 |
| 4,937,447 | 6/1990 | Barrett | 250/339 |

FOREIGN PATENT DOCUMENTS 470675 5/1969 Switzerland .
1308463 2/1973 United Kingdom .

*Primary Examiner*—Constantine Hannaher
*Attorney, Agent, or Firm*—Gerhard H. Fuchs

[57] ABSTRACT

Apparatus for remotely sensing changes in the spatial temperature profile of a column of atmospheric air includes (a) collecting means for receiving the thermal radiation from a column of atmospheric air, and for directing it to intensity sensing means; (b) sensing means with a rotatably mounted interference bandpass filter together with means for rotating the filter for sequentially tuning to and sensing the intensity in said column of atmospheric air of at least two spectral regions in the 4.17 to 4.2 $\mu$m region of the $CO_2$ spectral emission band; and (c) means for detecting temporal changes in the relative intensity of the spectral regions.

6 Claims, 3 Drawing Sheets

AIR TURBULENCE DETECTOR

FIELD OF THE INVENTION

This invention relates to the field of remote passive detection of air temperature gradients to provide early warning to aircraft of clear air turbulence and windshear conditions.

BACKGROUND OF THE INVENTION

U.S. Pat. No. 4,937,447 to Barrett discloses and claims apparatus for detecting air turbulence (windshear as well as clear air turbulence) in navigable airspace by remotely sensing changes in the spatial temperature profile in the air column ahead of an aircraft by repeatedly sensing the intensity of the thermal radiation from the column of atmospheric air in at least two spectral peaks in the 4.17 $\mu$m to 4.2 $\mu$m region of the $CO_2$ spectral emission band, and comparing the relative intensity of the spectral peaks over time. The apparatus utilizes a tunable Fabry-Perot etalon in combination with a bandpass filter for selecting the spectral emission bands. Tunable Fabry-Perot etalons are relatively expensive, delicate components. The present invention provides simplified apparatus which avoids the need for the Fabry-Perot etalon, by substituting a rotatably mounted bandpass filter for the etalon/filter combination of the prior art. The filter has a broader transmission region than the Fabry-Perot etalon. Accordingly, in the present embodiment, the relative intensity of such broader spectral regions (which may contain one or more spectral peaks) within the 4.17 $\mu$m to 4.2 $\mu$m region of the $CO_2$ spectral emission band is compared.

SUMMARY OF THE INVENTION

This invention provides apparatus for remotely sensing changes in the spatial temperature profile of a column of atmospheric air comprising, in combination, (a) collecting means for receiving the thermal radiation from a column of atmospheric air, and for directing it to intensity sensing means; (b) sensing means for sequentially sensing the intensity in said column of atmospheric air of at least two spectral regions in the 4.17 to 4.2 $\mu$m region of the $CO_2$ spectral emission band, which sensing means comprises a rotatably mounted interference bandpass filter in combination with means for rotating the filter; and (c) means for detecting temporal changes in the relative intensity of said spectral regions.

The transmission wavelength of the interference bandpass filter is dependent upon its angular position relative to the incident radiation. The apparatus is tuned to desired radiation wavelengths by rotating the filter to change its relative angular position.

Desirably the apparatus includes signal processing and display means for indicating changes in the temperature profile of the column of atmospheric air. Such changes, if of sufficient magnitude, are indicative of windshear or clear air turbulence. The display means may be a visual display, such as a cathode ray tube; an audio display, such as a warning horn; or a combination thereof.

A reference blackbody radiation source may be provided to permit relative measurement of the atmospheric infrared emission relative to a known, stable reference source.

BRIEF DESCRIPTION OF THE DRAWINGS

In the annexed drawings,

In FIGS. 2 and 3, like reference numerals refer to components performing like functions.

DETAILED DESCRIPTION OF THE INVENTION, OF THE PREFERRED EMBODIMENTS, AND OF THE BEST MODE PRESENTLY CONTEMPLATED FOR ITS PRACTICE

Figure 2:
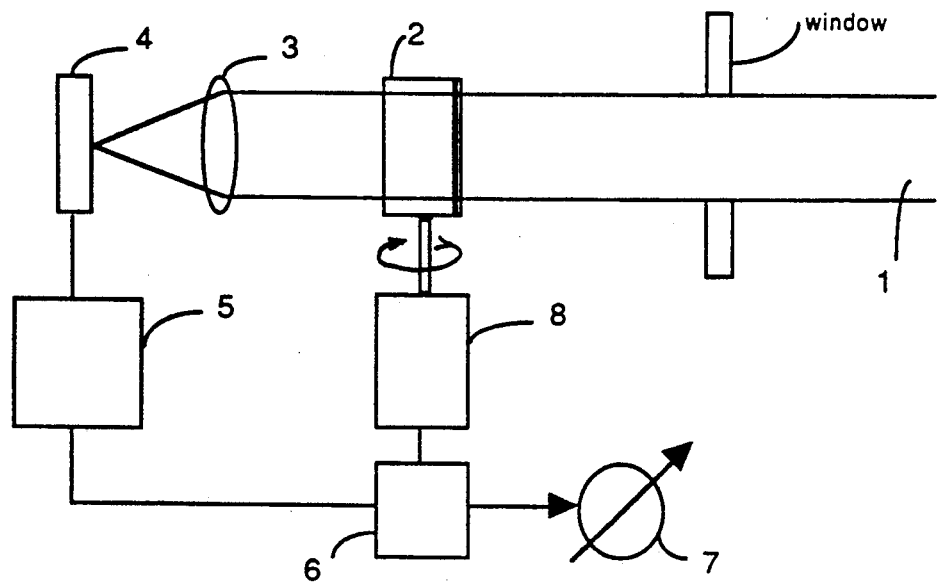
FIG. 2 is a schematic diagram of the invention apparatus for remotely sensing atmospheric air temperature profiles.

With reference to FIG. 2 of the drawings, a beam 1 of atmospheric infrared radiation is collected (by means not shown) and passed through rotatably mounted infrared interference bandpass filter 2. The transmission characteristics of filter 2 can be varied by changing its angular position relative to the incident radiation. In operation, rotation of filter 2 about an axis normal to the direction of beam 1 changes the angular position of filter 2 relative to beam 1, with resultant selective change in the radiation frequency being passed through the filter. The filtered beam is then focussed onto the infrared detector 4 by means of the lens 3. An indium antimonide (InSb) infrared detector 4 suitable for detecting the $CO_2$ emission radiation in the 4.2 $\mu$m region is commercially available from EG&G Judson, Montgomeryville, PA as Model J10D-M204-R02M. The detector has a 2 mm diameter active element and it is cooled to an operating temperature of 77 K by means of a liquid nitrogen dewar. The detector's electrical signal is directed to a D.C. coupled preamplifier 5 and the output of the preamplifier is passed to a signal processing means 6 which is connected to a suitable display/alarm device 7. Frequency control means 8 including a stepping motor is used to vary the angle of filter 2 relative to the beam 1 to center on preselected frequencies in the 4.17 to 4.2 $\mu$m region of the $CO_2$ emission band so that the signal intensity may be measured for a series of emission/absorption lines varying from strong to weak. Differences in the relative intensity of different bands within this emission region are then compared over time to obtain atmospheric temperature information as a function of range.

Figure 1:
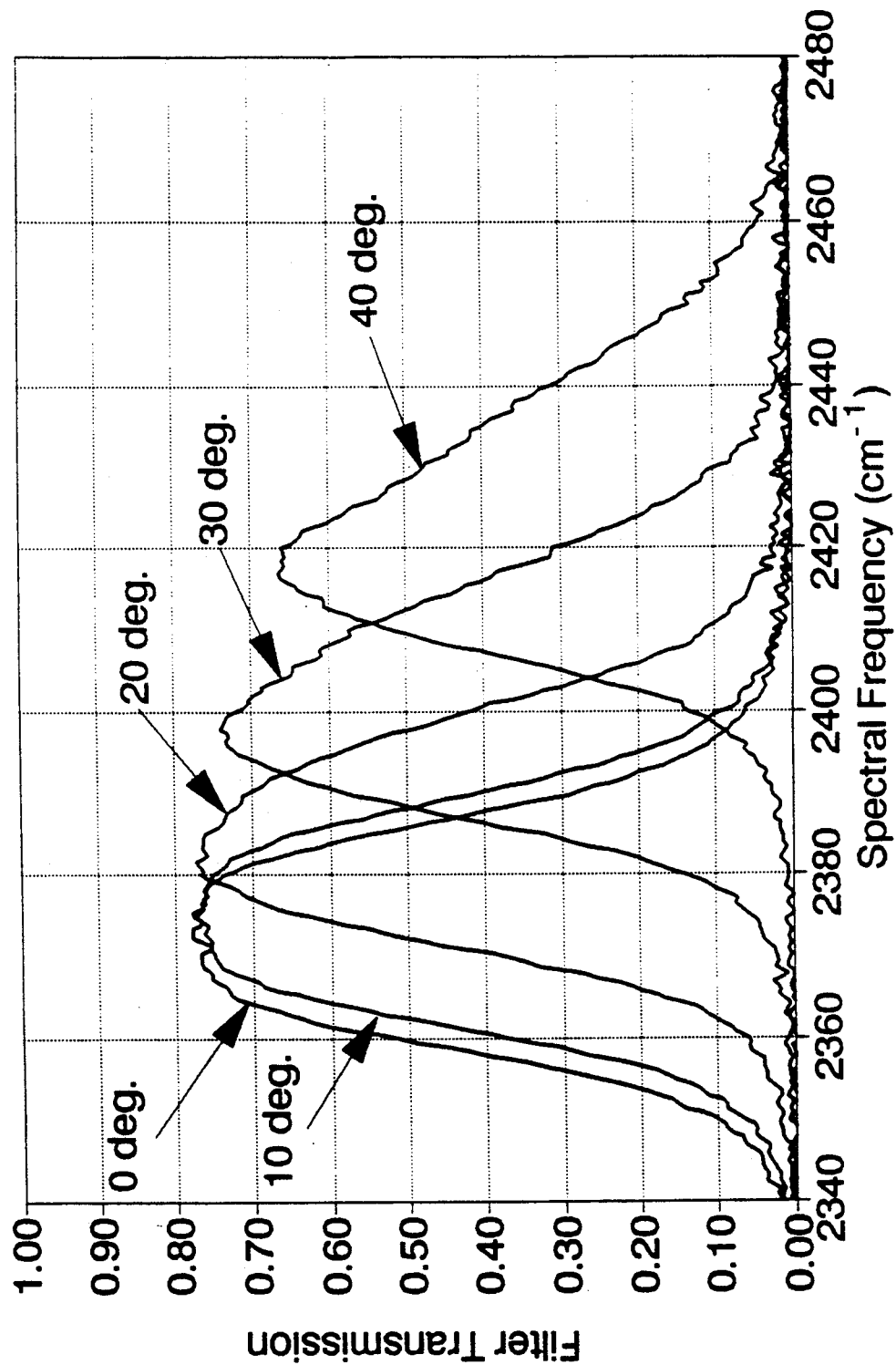
FIG. 1 shows the transmission curves for a certain infrared interference bandpass filter at various angular positions.

Filter 2 is an interference-type blocking filter transmitting only a small spectral region of the $CO_2$ band. Suitably, it has a spectral bandwidth of about 0.05 $\mu$m with a center wavelength of 4.227 $\mu$m (wavelength about 2370 cm$^{-1}$) and a peak transmission of about 76%. Such interference filters are standard items of commerce. FIG. 1 shows transmission curves for a representative filter for angular positions ranging from 0° to 40°.

The selection of the means for collecting beam 1 of atmospheric infrared radiation is not critical. Such means may comprise a pair of convex/concave mirrors, as illustrated in U.S. Pat. No. 4,937,447, or condenser lenses and the like, or they may be as simple as a plain window (which transmits in the spectral region of interest) for permitting the atmospheric radiation to enter the apparatus from a preselected direction.

Frequency control means 8 consisted of a computer-controlled stepper motor which permits precise angular positioning of the interference filter. The filter is rotated in steps of 3.6° from 0° to 39.6° and measurements of the radiometer output are recorded for each angular position. When the filter reaches 39.6°, the motor direction is reversed and data is collected as the filter is scanned back to the 0° position.

Figure 4:
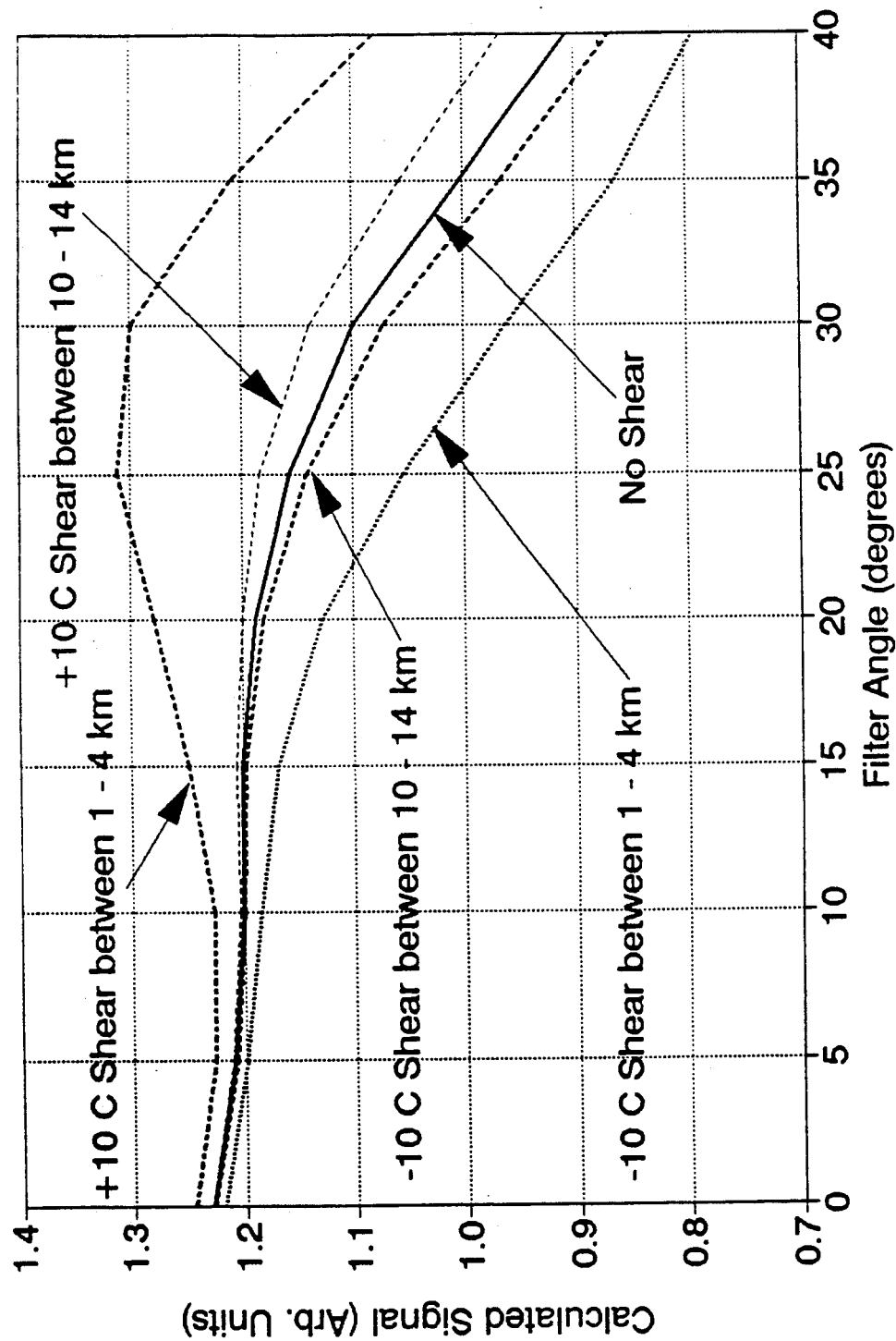
FIG. 4 is a computer-generated set of read-outs of the invention apparatus remotely sensing airspace temperature in the 1-4 km and the 10-14 km ranges.

The power received by the radiometer due to atmospheric emission is calculated using the equation $$P_i = \left[ \frac{\pi^2 D_d^2 T_i \Delta\omega}{16 F^2} \right] N_i \sum_j e^{-K_i R_j}$$

for each spectral component within the filter's transmission band. In the above equation, $N_i$ and $K_i$ are the FASCODE values for a 5 m path length of the radiance and extinction coefficient for the $i^{th}$ spectral component, respectively, and $T_i$ is the blocking filter transmission at the $i^{th}$ spectral component. The quantities $D_d$ and F are the diameter of the IR detector and the f/number of the system optics, respectively. The quantity $\Delta\omega$ is the optical bandwidth (in units of $cm^{-1}$) of the spectral filter used to tune over a narrow spectral region in the 4.17 to 4.2 μm $CO_2$ band. By measuring the radiometer signal at $CO_2$ emission/absorption frequencies ranging from strong to weak, it is possible to determine the atmospheric temperature profile as a function of range. These individual power values are multiplied with the filter's transmission value at the appropriate spectral frequency and the results are summed to yield the total signal detected by the radiometer for each angular position of the filter for angles between 0° and 40°. FIG. 4 shows the computer model results for different atmospheric temperature profiles. The plot shows the radiometer detected signal as a function of the blocking filter angle. The temperature profiles are for ±10°C. over a 4 km depth located at 1 km and 10 km. The figure shows that the deviation from the no shear response increases as the shear region moves closer to the radiometer.

Figure 3:
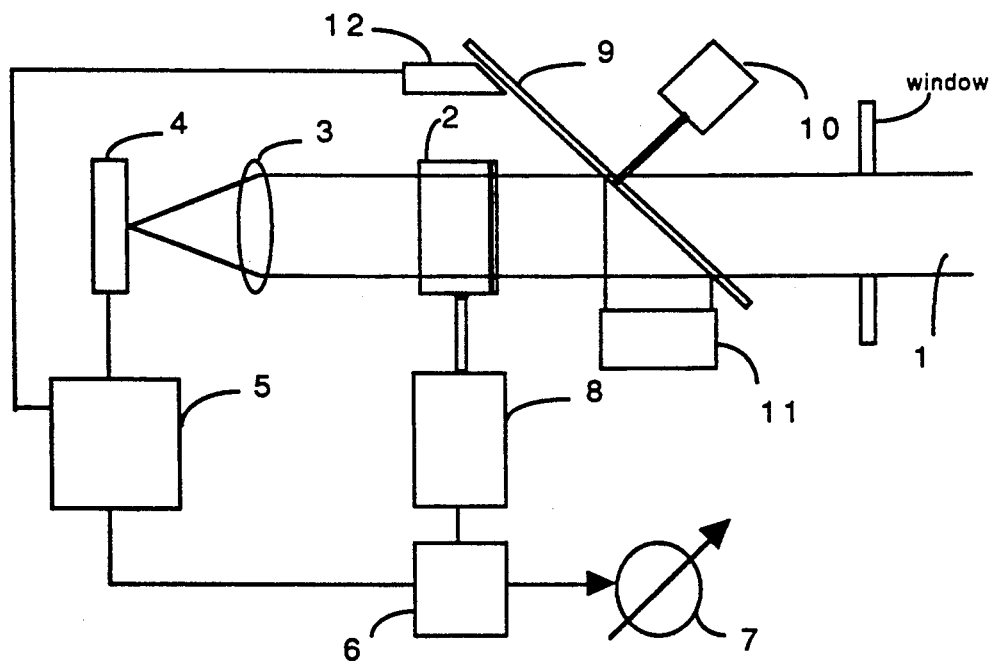
FIG. 3 is a schematic diagram of another embodiment of apparatus of the present invention provided with a blackbody reference emission source.

FIG. 3 illustrates another embodiment of apparatus of the present invention which incorporates an optional blackbody reference source. With reference to FIG. 3, infrared detector 4 is a lead selenide (PbSe) detector, such as is commercially available from Electro-Optical Systems, Phoenixville, PA, under the designation Model PbSe-010/E/T 5HS. Detector 4 has an active area of 1 mm ×1 mm and it is thermoelectrically cooled. Thermoelectric cooling is accomplished using an integral two stage Peltier device with an external control unit. Problems associated with the handling and use of liquid nitrogen (required for the InSb detector) are eliminated using the PbSe detector. The detector has a built in preamplifier with a voltage gain of 2000 and a frequency response of 100 Hz to 50 kHz. This preamplifier is an A.C. coupled amplifier which requires that the input signal be amplitude modulated. In order to accomplish the required modulation, the infrared atmospheric emission beam 1 is optically chopped by rotating aperture (chopper blade) 9 which is driven by chopper motor 10. Chopper blade 9 has a highly reflective gold-plated surface which functions as a mirror at a 45° angle during the closed portion of the chopping cycle. An optical reference signal is provided by a highly stable, temperature-controlled blackbody source 11 that is seen by the IR detector when the chopper blocks the infrared atmospheric emission. Therefore, the radiation incident on the IR detector is in the form of a square wave which alternates between the atmospheric emission radiation and the radiation from the reference blackbody source. The A.C. electrical output of the IR detector/preamplifier 4 is sent to the signal processing electronics 5 which is a lock-in amplifier. An electrical reference signal is provided by an opto-interrupter in cooperation with the chopper blade 9. This reference signal is fed to the lock-in amplifier to provide frequency and phase synchronization with the electrical signal from the IR detector preamplifier 4. The lock-in amplifier functions as a narrow bandpass electronic filter that selectively amplifies only those signals having the appropriate frequency and phase relationship as determined by the reference signal from the chopper. The output signal from the lock-in amplifier is proportional to the difference between the atmospheric emission power level and the power level due to the stable reference blackbody source. The use of the A.C. modulated signal in combination with a lock-in amplifier provides a very sensitive, low noise detection system that measures the infrared atmospheric emission relative to a known, stable blackbody reference source.

I claim:

1. Apparatus for remotely sensing changes in the spatial temperature profile of a column of atmospheric air comprising, in combination:
   (a) collecting means for receiving the thermal radiation from a column of atmospheric air, and for directing it to intensity sensing means;
   (b) sensing means for sequentially sensing the intensity in said column of atmospheric air of at least two spectral regions in the 4.17 to 4.2 μm region of the $CO_2$ spectral emission band, said sensing means comprising an interference bandpass filter mounted for step-wise rotation around an axis in the plane of the filter in combination with means for stepped rotation of said filter adapted to center on said spectral regions; and
   (c) detecting means for detecting temporal changes in the relative intensity of said spectral regions.

2. The apparatus of claim 1 further comprising signal processing and display means to indicate changes in the temperature profile of the column of atmospheric air.

3. The apparatus of claim 1 further comprising a blackbody reference source and means for comparing the sensed intensity of said spectral regions against the radiation from said blackbody reference source.

4. The apparatus of claim 3 further comprising signal processing and display means to indicate changes in the temperature profile of the column of atmospheric air.

5. The apparatus of claim 3 wherein said means for comparing the sensed intensity comprises means for alternately subjecting said sensing means to the blackbody radiation and the thermal radiation from the column of atmospheric air.

6. The apparatus of claim 5 further comprising signal processing and display means to indicate changes in the temperature profile of the column of atmospheric air.

* * * * *